(12) United States Patent
Williams (10) Patent No.: US 6,687,709 B2
(45) Date of Patent: Feb. 3, 2004

(54) APPARATUS FOR DATABASE RECORD LOCKING AND METHOD THEREFOR

(75) Inventor: Mark Joseph Williams, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/895,980

(22) Filed: Jun. 29, 2001

(65) Prior Publication Data

US 2003/0004924 A1 Jan. 2, 2003

(51) Int. Cl.[7] ............................................. G06F 17/30
(52) U.S. Cl. ........................................ 707/103 R; 707/1
(58) Field of Search .............................. 707/1, 2, 3, 4, 707/5, 10, 103; 710/200; 380/255

(56) References Cited

U.S. PATENT DOCUMENTS

| | | | | |
|---|---|---|---|---|
| 5,202,971 A | | 4/1993 | Henson et al. ............... 395/425 |
| 5,339,427 A | | 8/1994 | Elko et al. ................... 395/725 |
| 5,692,178 A | | 11/1997 | Shaughnessy ............... 395/608 |
| 5,742,813 A | * | 4/1998 | Kavanagh et al. ............. 707/8 |
| 5,983,225 A | | 11/1999 | Anfindsen ...................... 707/8 |
| 6,052,731 A | | 4/2000 | Holdsworth et al. ........ 709/229 |
| 6,144,983 A | | 11/2000 | Klots et al. ................. 709/104 |
| 6,343,339 B1 | * | 1/2002 | Daynes ....................... 710/200 |
| 6,373,950 B1 | * | 4/2002 | Rowney ..................... 380/255 |

* cited by examiner

*Primary Examiner*—Diane D. Mizrahi
*Assistant Examiner*—Yicun Wu
(74) *Attorney, Agent, or Firm*—Barry S. Newberger; Winstead Sechrest & Minick P.C.; Jeffrey S. LaBaw (57) ABSTRACT

A system and process for locking database records are implemented. A lock state is selectively set in response to a locking operation request. The lock state constitutes a class in an object-oriented locking service architecture. A locking operation corresponding to the locking operation request is performed on one or more records. The locking operation is implemented by a method of a lock state class in the object-oriented locking service architecture, the lock state class corresponding to a current lock state.

27 Claims, 8 Drawing Sheets

APPARATUS FOR DATABASE RECORD LOCKING AND METHOD THEREFOR

TECHNICAL FIELD

The invention relates in general to data processing systems for database management, and in particular, to a system for locking database records in a multi-threaded, distributed, data processing environment.

BACKGROUND INFORMATION

Database management systems (or other file management system) in a multi-threaded, or similar multiple client data processing system environment must implement a scheme for avoiding record collisions or contentions. That is, the database management system (DBMS) must incorporate a scheme for locking records so that a second client does not access the record during the pendency of an operation on the records by the first client.

Typically a software component which may be referred to as a "resource manager" controls which records are locked. The resource manager may track, for each record, whether the record is locked, including a type of lock such as a shared lock or exclusive lock, for the record. Consequently, the resource manager may, for a realistically sized database, be complex, with the locking and unlocking of records involving a multiplicty of decision paths. Thus, there is a need in the art for more efficient lock management systems.

SUMMARY OF THE INVENTION

The aforementioned needs are addressed by the present invention. Accordingly there is provided a method for database record locking. A lock state is selectively set in response to a locking operation request. The lock state constitutes a class in an object-oriented locking service architecture. A locking operation corresponding to the locking operation request is performed on one or more records. The locking operation is implemented by a method of a lock state class in the object-oriented locking service architecture, the lock state class corresponding to a current lock state.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. For example, database records maybe identified by particular numerical values, however it would be recognized by those of ordinary skill in the art that the present invention may be practiced without such specific details. Furthermore, the present invention, for clarity, may be described in the context of the Java™ programming language, however, the present invention may be practiced in other programming language context in addition to Java™. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Figure 1:
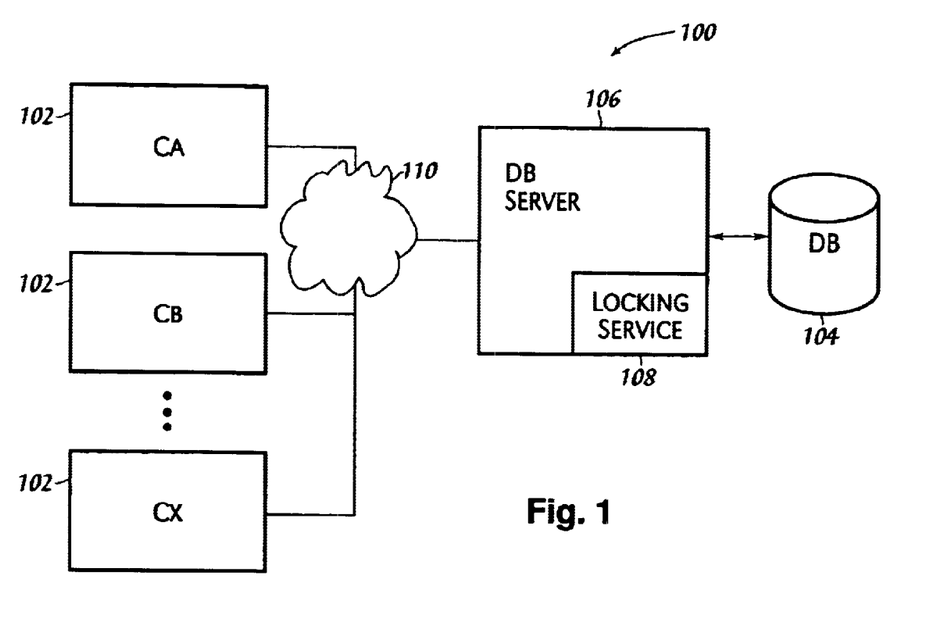
FIG. 1 illustrates, in block diagram form, a database system in accordance with an embodiment of the present invention.

Referring to FIG. 1 there is illustrated a database system 100 in accordance with the principles of the present invention. System 100 includes one or more database clients 102, labeled CA, CB, . . . , CX. Access to database (DB) 104 is mediated via database server 106 which includes locking service 108 in accordance with the principles of the present invention. Clients 102 may be coupled to database server 106 via network 110, may be a local machine or via a network which may be a local area network (LAN), wide area network (WAN), or the Internet.

Figure 2:
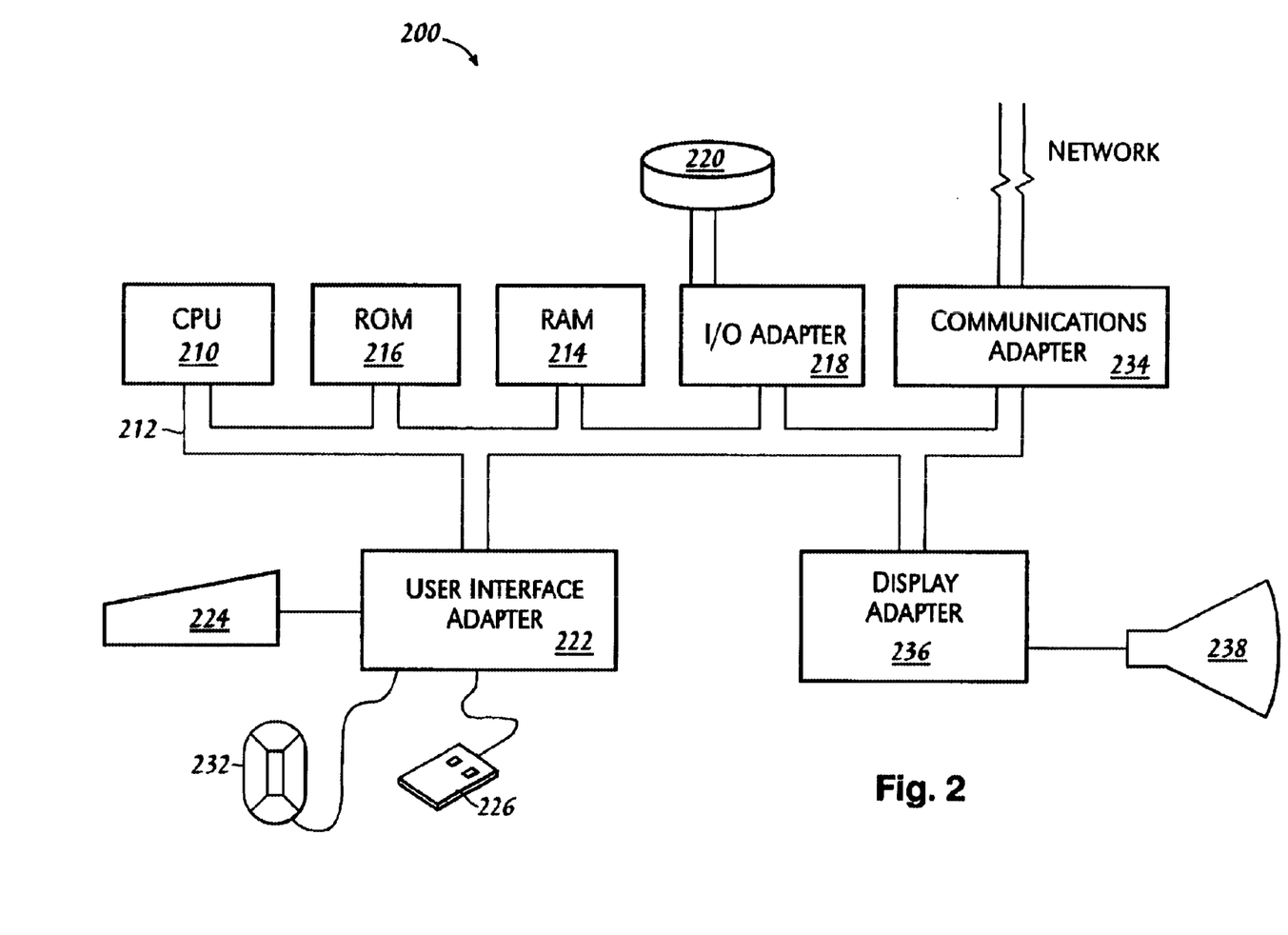
FIG. 2 illustrates, in block diagram form, a data processing system which may be used in conjunction with the embodiment of FIG. 1.

Refer now to FIG. 2 which illustrates a database server 106 in accordance with the principles of the present invention, in further detail. Server 106 may include a central processing unit (CPU) 210 coupled to various other components by system bus 212. An operating system 240 runs on CPU 210 and provides control and coordinates the function of the various components in FIG. 2. Application 250 includes locking service 108, FIG. 1, in accordance with the principles of the present invention and which will be described further in conjunction further with FIGS. 3–6 hereinbelow. Application 250 runs in conjunction with operating system 240, which coordinates the internal functions of database server 106, as would be understood by those of ordinary skill in the art. Additionally, read only memory (ROM) 216 is coupled to system bus 212 and includes a basic input/output system (BIOS) that control certain basic functions of server 106. Random access memory (RAM) 214, disk adapter 218 and communications adapter 234 are also coupled to system bus 212. It should be noted that software components including operating system 240 and application 250 are loaded into RAM 214 which is the computer systems main memory. Disk adapter 218 may be a Universal Serial Bus (USB) or other adapter that communicates with disk units 220. It is noted that the program of the present invention may reside in disk unit 220 and loaded into RAM 214 by operating system 240, as required. Communications adapter 234 interconnect bus 212 with a network, such as network 110, FIG. 1.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. And to require by server 106, the set of instructions maybe stored as a computer program product in another computer memory, for example in disk drive 220 (which may include a removable memory such as an optical disk or floppy disk for eventual use in disk drive 220). Furthermore, the computer program product can also be stored in another computer and transmitted when desired to the work station by a network or by an external network such as the Internet. One skilled in the art would appreciate that the physical storage of the sets of instructions physically changes the medium upon which it is stored so that the medium carries computerable information. The change may be electrical, magnetic, chemical or some other physical change.

Figure 3:
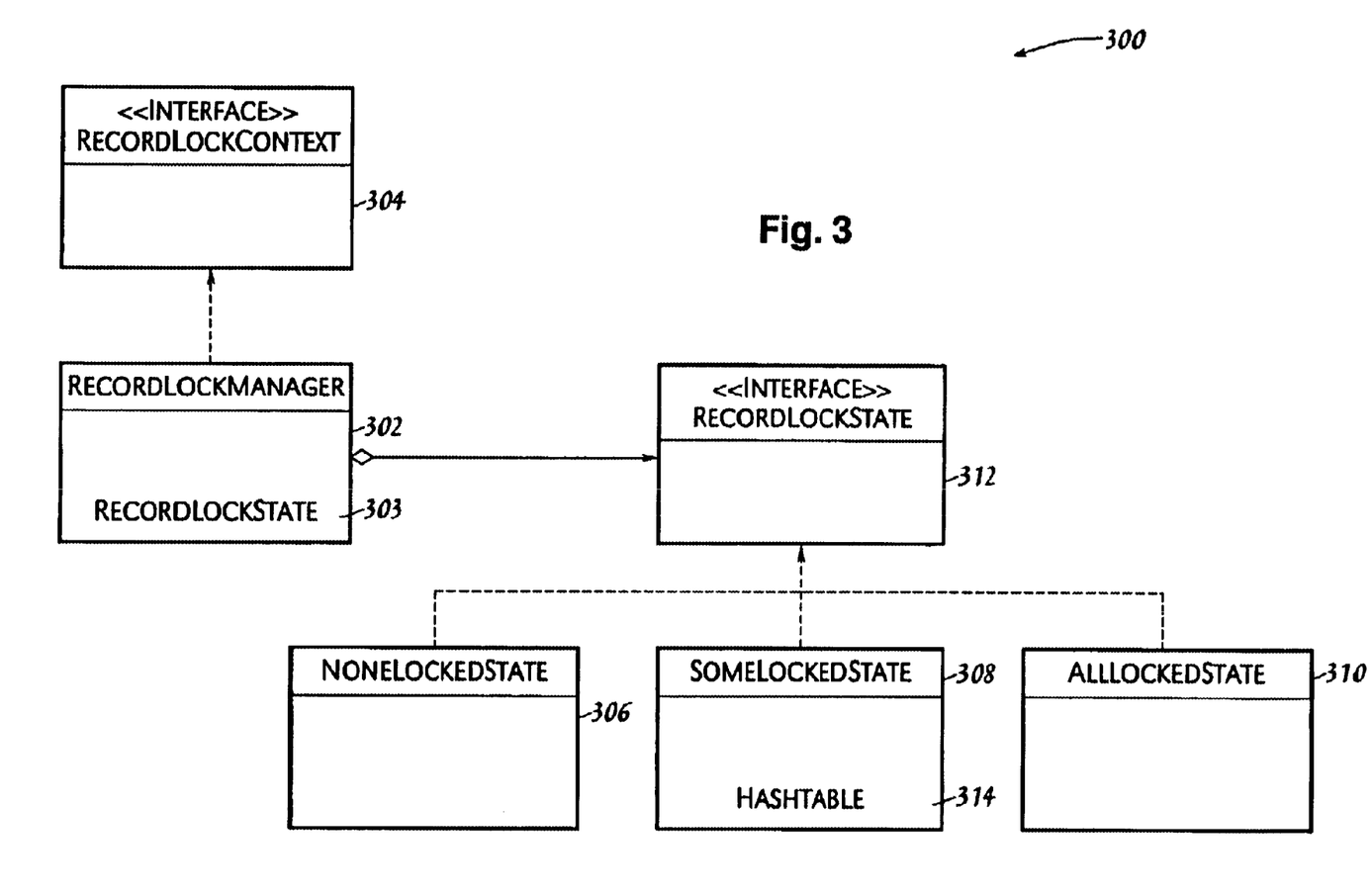
FIG. 3 schematically illustrates an object-oriented architecture for managing record blocking in accordance with the principles of the present invention.

Refer now to FIG. 3 illustrating an object-oriented locking service architecture 300 for providing locking services in accordance with the principles of the present invention. RecordLockManager class 302 manages transitions between lock states of the database, which states will be described further below. Additionally, RecordLockManager class 302 includes methods for handling the locking and unlocking of database records. RecordLockManager class 302 implements RecordLockContext 304. RecordLockContext 304 is an interface class. An interface class defines methods that are implicitly abstract. Thus, RecordLockManager 302 may provide an implementation of a changeState ( ) method for managing state transitions, defined by RecordLockContext 304. (In the Java™ programming language context, an interface class replaces the multiple inheritance of other object-oriented programming languages such s C++.)

RecordLockManager 302 also contains a RecordLockState object 303 representing the current lock state of the database. RecordLockState object 303 maybe an instance of one of three state classes, NoneLockedState class 306, SomeLockedState class 308 and AllLockedState class 310. RecordLockState object 303 may change as the database transitions into different states, as discussed below. Note that RecordLockState object 303 may be a singleton, that is a single instantiation of a class, for the entire system. All three classes implement RecordLockState interface 312 defining methods for locking and unlocking records, which are implemented by each NoneLockedState class 306, SomeLockedState class 308 and AllLockedState class 310.

The NoneLockedState class 306 represents a state in which all records are freely available in the database. (This may be the default initial state of the database when a server in accordance with the principles of the present invention starts.) AllLockedState class 310 represents a state in which the entire database is locked. SomeLockedState class 308 represents a state in which one or more individual records in the database are locked. SomeLockedState class 308 may include hashtable 314, which contains a hash of all of the records in the locked state.

The current lock state of the database, represented by RecordLockState object 303, can transition to a different one of NoneLockedState, SomeLockedState or AllLockedState when either a lock or unlock request is called on the corresponding one of NoneLockedState class 306, SomeLockedState class 308 or AllLockedState class 310. (Note that a lock request and unlock request may collectively be referred to as a locking operation request.) Locking operation requests may be received from a client, such as one of clients 102, FIG. 1.

Figure 4:
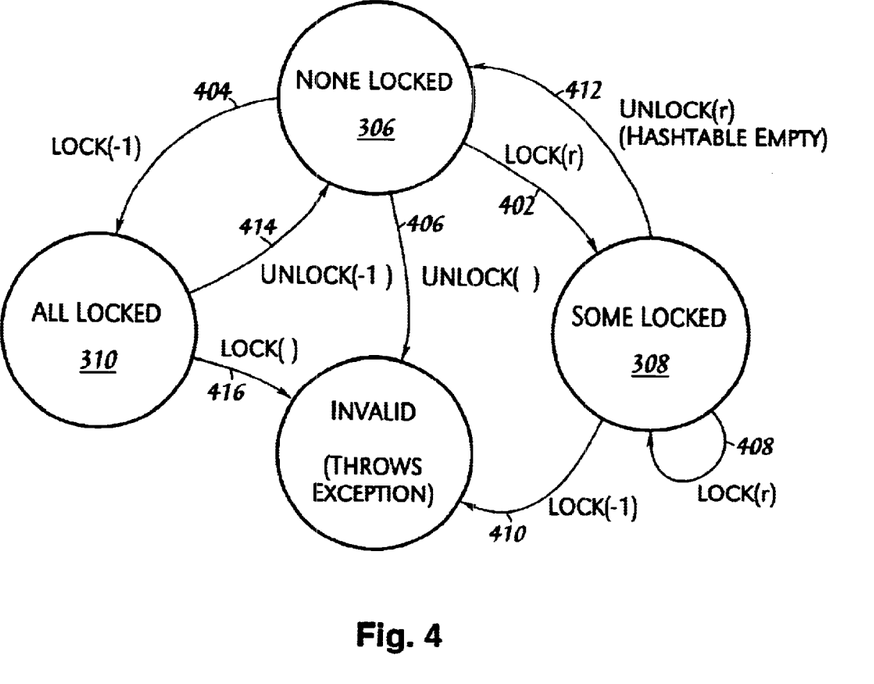
FIG. 4 illustrates a state diagram for the transitioning of states in accordance with the architecture of FIG. 3.

The transitions between different states may be understood by referring now to FIG. 4 illustrating a state diagram in accordance with the principles of the present invention. Consider first NoneLockedState class 306. Calling lock( ) on NoneLockedState class 306 may transition the state to either AllLockedState 310 or SomeLockedState 308. If the lock is called with a valid record number (indicated by "γ" in FIG. 4) then the state transitions to SomeLockedState 308, transition 402. Records may be identified by a unique identifier, for example, a record number which may be in a range from zero to a predetermined maximum record number. However, other record numbers may be used in an alternative embodiments of the present invention, and these would be understood by those of ordinary skill in the art to fall within the spirit and scope of the present invention. Additionally, a particular identifier may be associated with the entire database. In FIG. 4, the record number value "−1", denotes the entire database. Calling lock(−1) on NoneLockedState 306 transitions the state to AllLockedState 310, transition 404. Calling unlock( ) on NoneLockedState 306 results in an invalid transition, and an exception may be thrown, transition 406.

Consider now transitions from SomeLockedState 308. If a lock request is made on a record, γ, that is, a lock request as called on SomeLockedState 308, the state remains in SomeLockedState class 308, transition 408. Requesting a lock on the entire database by calling lock (−1) on SomeLockedState 308 is invalid, transition 410. Additionally, an unlock request may be made on SomeLockedState class 308. If the hash table, such as hash table 314, FIG. 4 is empty as a result of the unlock operation, a transition of the current state from SomeLockedState class 308 to NoneLockedState 306 results, transition 412. (The operations on the hashtable will be described in conjunction with FIG. 5 hereinbelow.)

Now consider locking and unlocking requests called on AllLockedState class 310. If an unlock request on the entire database is called on AllLockedState class 310, a transition to NoneLockedState 306 results, transition 414. Calling a lock on AllLockedState class 310 results in an invalid transition, and again, an exception may be thrown, transition 416.

Figure 5A:
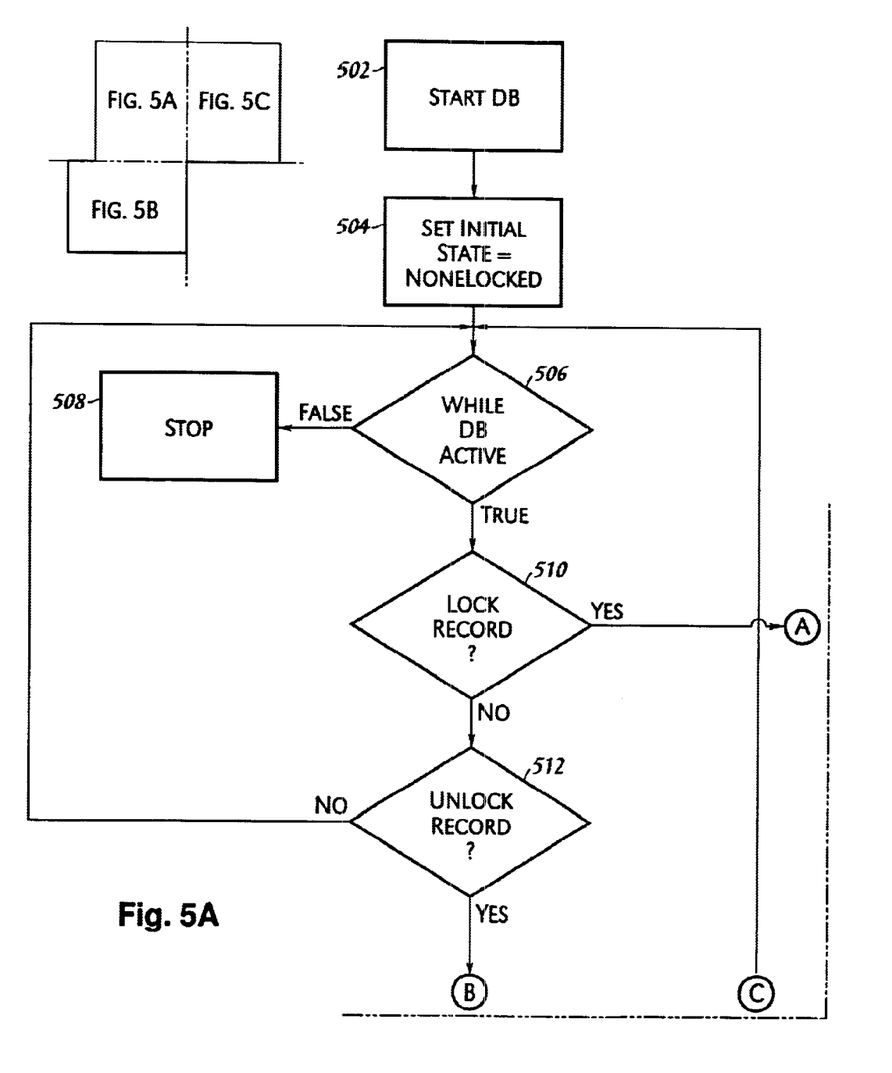
FIG. 5 illustrates, in flowchart form, a record locking methodology in accordance with an embodiment of the present invention.
Figure 5B:
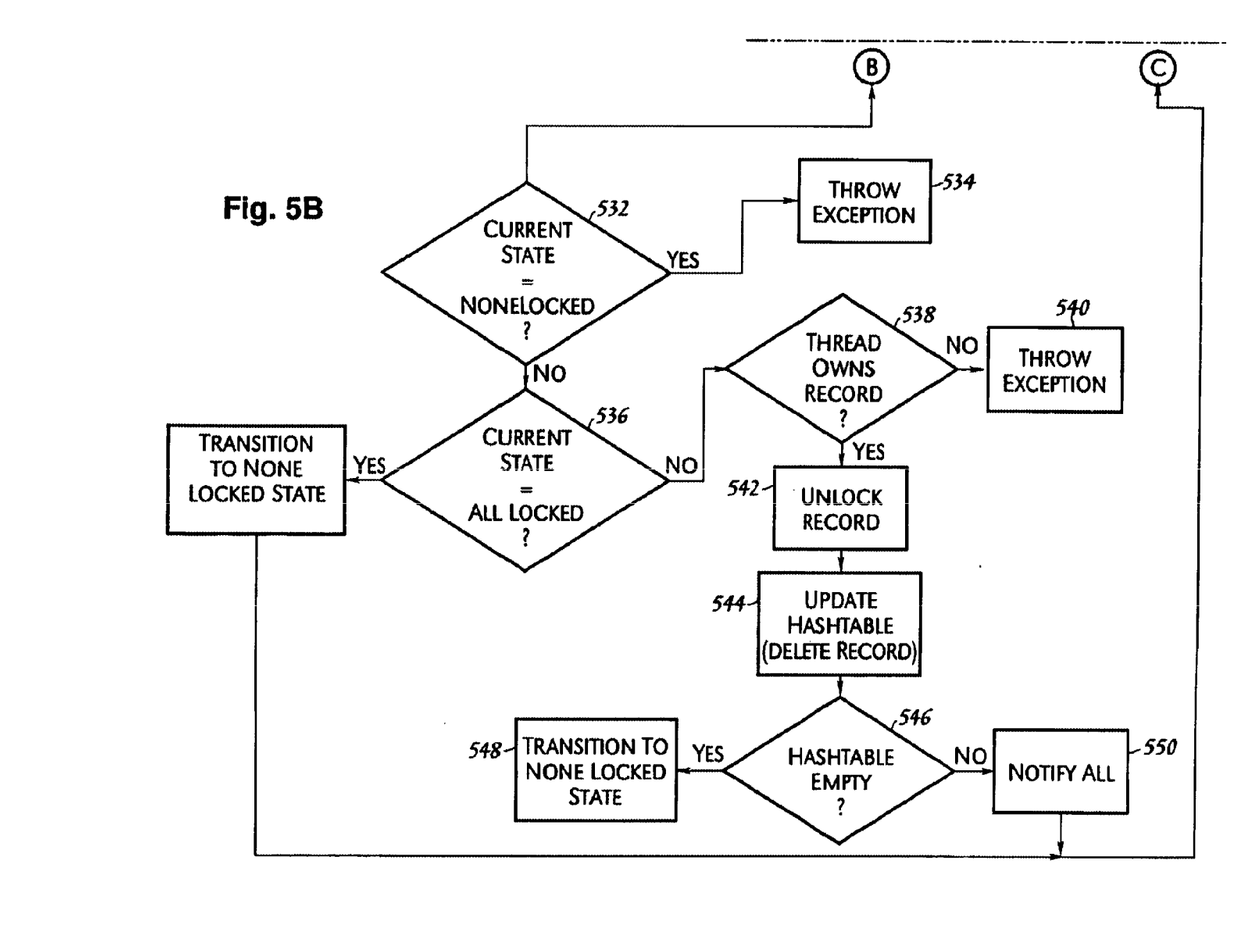
Figure 5C:
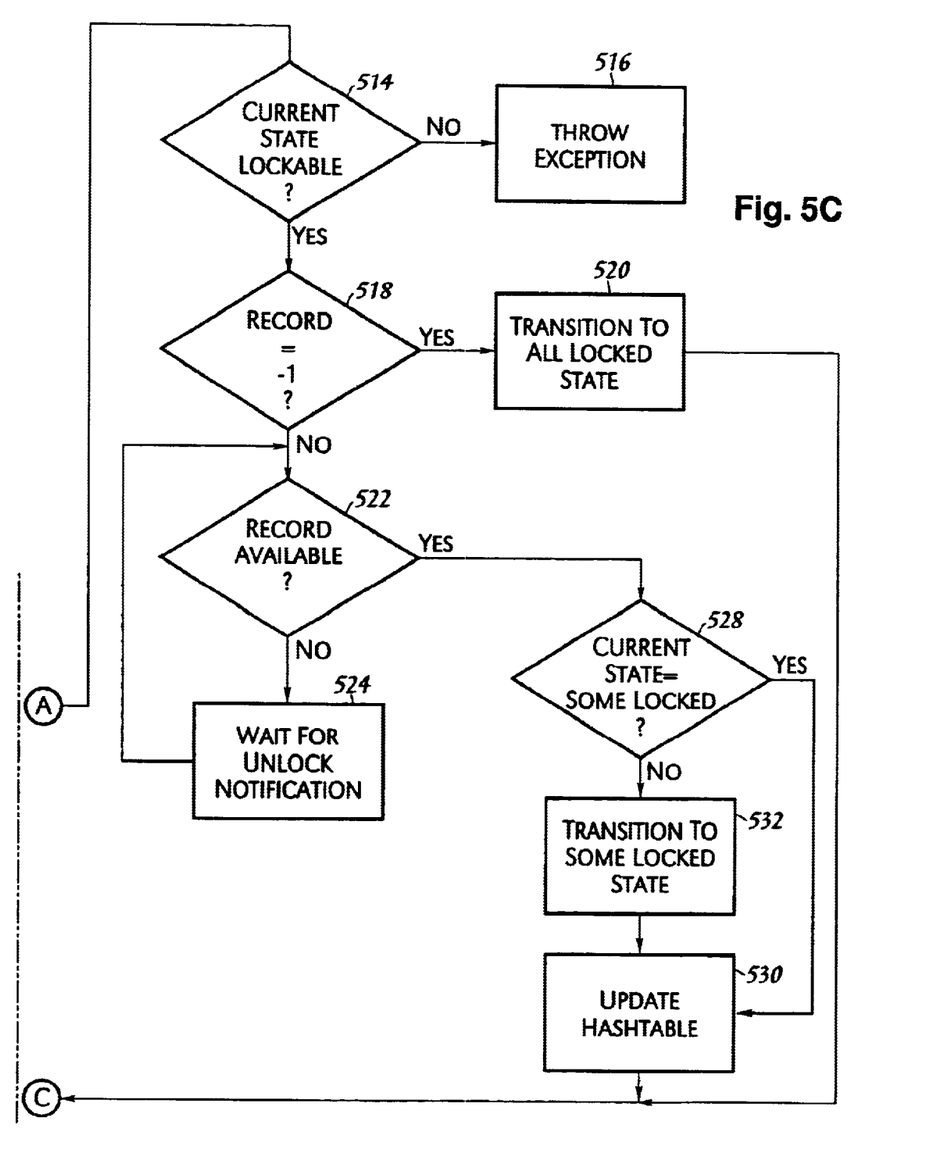
Figure 6:
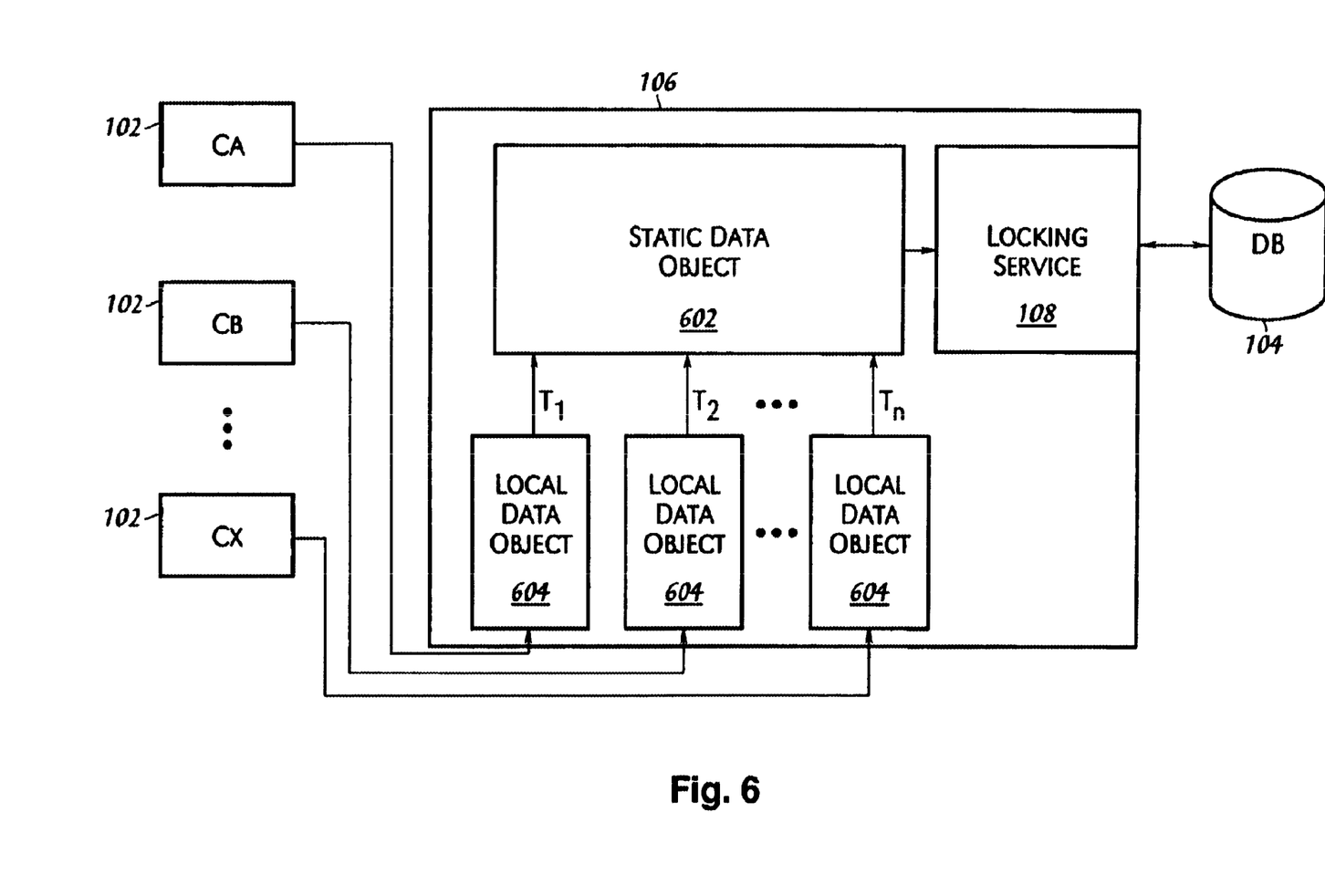
FIG. 6 illustrates in further detail a database system in accordance with the principles of the present invention.

Refer now to FIG. 5 illustrating, in flow chart form, a locking methodology 500 in accordance with the principles of the present invention. The steps of methodology 500 may be performed by one or more of the methods of the classes in the objected oriented architecture described hereinabove in conjunction with FIG. 3. This will be discussed in further detail below.

Initialization of the database is performed in steps 502 and 504. In step 502, the database is started. In step 504, the current state is initialized to NoneLockedState. In step 506, locking methodology 500 enters a locking event loop, that is active while the database is active, and terminates, in step 508, when the database is inactive.

While in the locking event loop, locking requests from database clients, such as clients 102, FIG. 1, are handled in steps 510 and 512, respectively. Lock and unlock requests may be handled by RecordManager.lock( ) and RecordLock.unlock( ) methods in an embodiment in accordance with the inventive principles of object-oriented architecture 300, FIG. 3. If neither a lock or unlock request is receiver, methodology loops between steps 506, 510 and 512.

If, in step 510, a lock request is received, it is determined, in step 514, if the current state is lockable. If not, in step 516, an exception is thrown. Recall that, referring to FIG. 4, a lock request on the AllLockedState is invalid. If the current state is lockable, in step 518 it is determined if the record number corresponds to the record number representing the entire database, which may be −1, for example. If the lock request is for the entire database, the current state transitions to the AllLockedState, in step 520. The current state may be changed in an embodiment accordance with the architecture of FIG. 3 by the RecordManager.changeState( ) method which implements the changeState( ) method defined in RecordLockContext 304, FIG. 3.

If, however, the lock request is not for the entire database, then the lock request is directed to a particular record, which as previously discussed, may be identified by a record number, for example. In step 522, methodology 500 enters a loop pending availability of the record. If the record is not available (that is, the record is currently locked by another client), in step 524, methodology waits for an unlock notification. (In an embodiment of the present invention in accordance with architecture 300, FIG. 3, step 522 may be performed by detecting the current state to be an AllLockedState object, or a SomeLockedState object with a hashtable entry corresponding to the record lock request.) When the record becomes available, methodology 500 breaks out of the loop via the "Yes" branch in step 522.

If (step 528), the current state is SomeLockedState, then, as described hereinabove, the lock state remains SomeLockedState, and in step 530, the hashtable is updated to include the record number or other identifier of the record corresponding to the lock request, thereby locking the record. (This may be performed by the SomeLockedState.lock( ) method implemented by SomeLockedState class 308, FIG. 3, which may be passed the request by RecordManager.lock( ).

Otherwise, in step 532, the state transitions to SomeLockedState. (Recall that a valid lock request may also be called on a current NoneLockedStated.) Step 532 may be performed by the RecordManager.changeState( ) method, as described above, and the lock request passed to the SomeLockedState.lock( ) method in an embodiment in accordance with object-oriented architecture 300, FIG. 3, to update the hashtable, step 530, as previously discussed. Methodology 500 returns to step 506 to continue to process lock and unlock requests.

Returning to step 512, if an unlock request is received, in step 532 it is determined if the current state is NoneLockedState. If so, in step 534, an exception is thrown. Recall that, referring to FIG. 4, an unlock request on the NoneLockedState is invalid.

Otherwise, it is determined (step 536) if the current state is AllLockedState. If so, the current state transitions to the NoneLockedState, and methodology 500 returns to step 506.

In an embodiment of the present invention, each lock and unlock request maybe associated with a separate thread of execution. This may be understood by referring to FIG. 6 which illustrates the database system of FIG. 1 in further detail. Database elements may be represented in the database server, such as server 106, by a static data object 602, of which there may be a single instance. Methods of static data object 602 implement actions on database elements, including the locking and unlocking of records, which may be effected via locking service 108, in accordance with the principles of the present invention. Each request from a client, such as one of clients 102 may be mediated by a separate thread of execution (or simply, execution thread), denoted $T_1, T_2, \ldots, T_n$ in FIG. 6. (Threads of execution also may be referred to a execution threads, or simply, threads.) Each thread may invoke the methods of static data object 602 through an instance of a corresponding local data object 604. Additionally, each locked record may be associated with the thread that "locked" it.

Returning to FIG. 5, in step 538, it is determined if the thread requesting the unlocking of the record "owns" the record, that is, if the thread associated with the request locking the record is the unlocking thread. If not, in step 540, an exception is thrown. Otherwise, the record is unlocked, step 542. Step 542 may be performed by SomeLockedState.unlock( ), in an embodiment in accordance with the object-oriented architecture of FIG. 3.

In step 544, the record number, or other identifier, of the unlocked record is deleted from the hashtable. In step 546, it is determined if the hashtable is empty. If so, there are no locked records, and in step 548, the current state transitions to NoneLockedState. Otherwise, the current state is unchanged, and step 548 is bypassed.

Recall that, as discussed in conjunction with steps 522 and 524, a client may be waiting for the record to become available. In step 550, all threads are notified that the record has been unlocked, and methodology 500 returns to step 506.

Although the present invention and its advantages have been described in detail, it should be understood that various changes, substitutions and alterations can be made herein without departing from the spirit and scope of the invention as defined by the appended claims.

What is claimed is:

1. A method of locking at least on record in a database comprising the steps of:
   selectively setting a lock state for said database in response to a locking operation request, wherein said lock state comprises an object in an object oriented locking service architecture, said lock state compromising one of a NoneLockedState, SomeLockedState and AllLockState; and
   performing a locking operation corresponding to said locking operation request on one or more records said locking operating being implemented by a method of a lock state class in said object-oriented locking service architecture corresponding to a current lock state.

2. The method of claim 1 wherein said locking operation comprises one of a lock operation and an unlock operation.

3. The method of claim 2 wherein said locking operation request includes an identifier of said one or more records.

4. The method of claim 1 wherein said step of selectively setting said lock state in response to said locking operation request includes transitioning from a first lock state to a second lock state.

5. The method of claim 4 wherein said step of transitioning from said first lock state to said second lock state is performed by a method of a a record manager class in said object-oriented locking service architecture.

6. The method of claim 2 further comprising the step of, if said locking operation request is a lock request, determining if said one or more records is available.

7. The method of claim 5 further comprising the step of updating a hashtable in response to said step of performing said locking operation corresponding to said locking operation request, wherein said hashtable includes one or more identifiers corresponding to locked records.

8. The method of claim 1 wherein said locking operation request is associated with an execution thread, and wherein each locked record is associated with a lock request thread of execution locking a corresponding one of each locked record.

9. The method of claim 8 further comprising the step of, if said locking operation request comprises an unlock request, determining if an execution thread corresponding to said unlock request comprises a same execution thread corresponding to a lock request locking said one or more records.

10. A data processing system for database record locking comprising:

circuitry operable for selectively setting a lock state in response to a locking operation request, wherein said lock state comprises an object in an object-oriented locking service architecture, said lock state comprising one of a NoneLockedState, SomeLockedState and AllLockedState; and circuitry operable for performing a locking operation corresponding to said locking operation request on one or more records said locking operation being implemented by a method of a lock state class in said object-oriented locking service architecture corresponding to a current lock state.

11. The system of claim 10 wherein said locking operation comprises one of a lock operation and an unlock operation.

12. The system of claim 11 wherein said locking operation request includes an identifier of said one or more records.

13. The system of claim 10 wherein said circuitry operable for selectively setting said lock state in response to said locking operation request includes circuitry operable for transitioning from a first lock state to a second lock state.

14. The system of claim 13 wherein said circuitry operable for transitioning from said first lock state to said second lock state is operable in response to a method of a a record manager class in said object-oriented locking service architecture.

15. The system of claim 11 further comprising circuitry operable for, if said locking operation request is a lock request, determining if said one or more records is available.

16. The system of claim 14 further comprising circuitry operable for updating a hashtable in response to said circuitry operable for performing said locking operation corresponding to said locking operation request, wherein said hashtable includes one or more identifiers corresponding to locked records.

17. The system of claim 10 wherein said locking operation request is associated with an execution thread, and wherein each locked record is associated with a lock request thread of execution locking a corresponding one of each locked record.

18. The system of claim 17 further comprising circuitry operable for, if said locking operation request comprises an unlock request, determining if an execution thread corresponding to said unlock request comprises a same execution thread corresponding to a lock request locking said one or more records.

19. A computer program product in a machine readable storage medium, the program product for database record locking, comprising programming instructions for performing the steps of:

selectively setting a lock state in response to a locking operation request, wherein said lock state comprises an object in an object-oriented locking service architecture, said lock state comprising one of a NoneLockedState, SomelockedState and AllLockedState; and performing a locking operation corresponding to said locking operation request on one or more records said locking operation being implemented by a method of a lock state class in said object-oriented locking service architecture corresponding to a current lock state.

20. The program product of claim 19 wherein said locking operation comprises one of a lock operation and an unlock operation.

21. The program product of claim 20 wherein said locking operation request includes an identifier of said one or more records.

22. The program product of claim 19 wherein said step of selectively setting said lock state in response to said locking operation request includes transitioning from a first lock state to a second lock state.

23. The program product of claim 22 wherein said step of transitioning from said first lock state to said second lock state is performed by a method of a a record manager class in said object-oriented locking service architecture.

24. The program product of claim 20 further comprising programming instructions for performing the step of, if said locking operation request is a lock request, determining if said one or more records is available.

25. The program product of claim 23 further comprising programming instructions for performing the step of updating a hashtable in response to said step of performing said locking operation corresponding to said locking operation request, wherein said hashtable includes one or more identifiers corresponding to locked records.

26. The program product of claim 19 wherein said locking operation request is associated with an execution thread, and wherein each locked record is associated with a lock request thread of execution locking a corresponding one of each locked record.

27. The program product of claim 26 further comprising programming for performing the step of, if said locking operation request comprises an unlock request, determining if an execution thread corresponding to said unlock request comprises a same execution thread corresponding to a lock request locking said one or more records.

* * * * *